US009589500B2

(12) United States Patent
Xu

(10) Patent No.: US 9,589,500 B2
(45) Date of Patent: Mar. 7, 2017

(54) COMMON VOLTAGE COMPENSATION CIRCUIT, COMPENSATING METHOD THEREOF, ARRAY SUBSTRATE AND DISPLAY APPARATUS

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventor: Yizhen Xu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 111 days.

(21) Appl. No.: 14/567,510

(22) Filed: Dec. 11, 2014

(65) Prior Publication Data

US 2016/0063941 A1 Mar. 3, 2016

(30) Foreign Application Priority Data

Aug. 29, 2014 (CN) .......................... 2014 1 0438400

(51) Int. Cl.

| | |
|---|---|
| ***G06F 3/038*** | (2013.01) |
| ***G09G 3/32*** | (2016.01) |
| ***G09G 3/36*** | (2006.01) |

(52) U.S. Cl.

CPC ......... *G09G 3/3225* (2013.01); *G09G 3/3208* (2013.01); *G09G 3/3614* (2013.01);

(Continued)

(58) Field of Classification Search

CPC . G11C 19/00; G09G 3/36; G09G 3/34; G09G 3/32; G09G 3/30; G09G 5/00;

(Continued)

(56) References Cited

U.S. PATENT DOCUMENTS

2004/0090402 A1* 5/2004 Cheng ...................... G09G 3/30 345/77

2006/0066552 A1* 3/2006 Morita ................. G09G 3/3655 345/94

(Continued)

*Primary Examiner* — Pegeman Karimi

(74) *Attorney, Agent, or Firm* — Ladas & Parry LLP

(57) ABSTRACT

The present disclosure discloses a common voltage compensation circuit, a compensating method thereof, an array substrate and a display apparatus, when a difference between the common voltage on the common electrode line and a reference voltage is great, the comparison module outputs a zero voltage signal to an inversion module, the common voltage on the common electrode line is compensated by the common voltage compensation circuit; when the difference between the common voltage on the common electrode line and the reference voltage is small, the comparison module outputs a first level signal to the inversion module, the common voltage on the common electrode line is not compensated by the common voltage compensation circuit, The common voltage on the common electrode line can be stabilized, thus a problem of abnormities occurred in a display picture of the display panel could be avoided.

20 Claims, 6 Drawing Sheets

(52) U.S. Cl.
CPC ..... *G09G 3/3655* (2013.01); *G09G 2330/028* (2013.01); *G09G 2330/12* (2013.01)

(58) Field of Classification Search
CPC .. G09G 3/10; G06F 3/038; G05F 1/00; G05F 1/10; G05F 1/40; H02J 3/12
See application file for complete search history.

(56) References Cited

U.S. PATENT DOCUMENTS

| | | | | |
|---|---|---|---|---|
| 2012/0299895 | A1* | 11/2012 | Lin | G09G 3/3655 345/211 |
| 2013/0321494 | A1* | 12/2013 | Takaki | G09G 3/2018 345/691 |
| 2014/0062990 | A1* | 3/2014 | Zhang | G09G 3/3696 345/212 |

* cited by examiner

COMMON VOLTAGE COMPENSATION CIRCUIT, COMPENSATING METHOD THEREOF, ARRAY SUBSTRATE AND DISPLAY APPARATUS

TECHNICAL FIELD

Embodiments of the present disclosure relate to a common voltage compensation circuit, a compensating method thereof, an array substrate and a display apparatus.

BACKGROUND

In an existing display apparatus, an organic electroluminescent display (OLED, Organic Light Emitting Diode) has advantages of simple manufacturing process, low cost, high luminous efficiency and being easy to form a flexible structure etc.; a liquid crystal display (LCD) has advantages of low power consumption, good displaying quality, no electromagnetic radiation and wide application area etc. Currently, both the organic electroluminescent display and the liquid crystal display are the important display apparatuses.

Voltages are applied to a pixel electrode and a common electrode in the liquid crystal display respectively, a electric field formed between the pixel electrode and the common electrode controls liquid crystal molecules to rotate and the liquid crystal molecules modulate backlights transmitted, so that the backlight is enabled to irradiate to a color film layer, which has different light intensity transmittances for different spectral bands, in different light intensities, and finally the light of the required color is presented. The voltages are applied to an anode (i.e., the pixel electrode) and a cathode (i.e., the common electrode) in the organic electroluminescent display respectively, cavities generated at the anode and electrons generated at the cathode compose excitons at a light-emitting layer, energies of the excitons are transferred to light-emitting molecules in the light-emitting layer, so that the electrons in the light-emitting molecules emit light due to a radiative recombination.

In the existing liquid crystal displays and organic electroluminescent displays, the common voltage applied to a common electrode line by a common voltage generation circuit may increase or decrease because such a common voltage is likely to be affected by other voltages, which would result problems such as shaking, stick images, gray scale abnormity in the displaying and crosstalk etc. in a picture displayed by the liquid crystal display and the organic electroluminescent display, thus displaying qualities of the liquid crystal display and the organic electroluminescent display are affected.

Accordingly, the common voltage on the common electrode line is needed to be stabilized.

SUMMARY

In view of this, embodiments of the present disclosure provide a common voltage compensation circuit, a compensating method thereof, an array substrate and a display apparatus, which can stabilize the common voltage on the common electrode line.

Accordingly, an embodiment of the present disclosure provides a common voltage compensation circuit, comprising a comparison module, an inversion module, and a voltage regulation module; wherein, the comparison module is configured to compare a common voltage loaded on the common electrode line in the display panel with an reference voltage, to output a zero voltage signal to the inversion module when a difference between the common voltage and the reference voltage is greater than or equal to a preset threshold value, and to output a first level signal to the inversion module when the difference between the common voltage and the reference voltage is less than the preset threshold value;

the inversion module is configured to output a second level signal to the voltage regulation module when the zero voltage signal sent by the comparison module is received, and to output the zero voltage signal to the voltage regulation module when the first level signal sent by the comparison module is received;

the voltage regulation module is configured to output the reference voltage to the common electrode line in the display panel when the second level signal sent by the inversion module is received, and to output the zero voltage signal to the common electrode line in the display panel when the zero voltage signal sent by the inversion module is received.

In one possible implementation, in the above-described common voltage compensation circuit according to the embodiment of the present disclosure, the comparison module comprises: a comparator and a first switch transistor; wherein, a first input terminal of the comparator is connected with the common electrode line in the display panel, a second input terminal of the comparator is connected with a port for inputting the reference voltage, and an output terminal of the comparator is connected with a gate of the first switch transistor;

a source of the first switch transistor is grounded, and a drain of the first switch transistor is connected with an input terminal of the inversion module via a port for inputting the first level signal.

In one possible implementation, in the above-described common voltage compensation circuit according to the embodiment of the present disclosure, the comparison module further comprises: a sampler, and a control power supply for controlling a periodical enabling of the sampler;

an input terminal of the sampler is connected with the output terminal of the comparator, a control terminal of the sampler is connected with the control power supply, and an output terminal of the sampler is connected with the gate of the first switch transistor.

In one possible implementation, in the above-described common voltage compensation circuit according to the embodiment of the present disclosure, the first switch transistor is a P type transistor, the comparator is configured to output a low level signal to the gate of the first switch transistor when the difference between the common voltage and the reference voltage is greater than or equal to the preset threshold value, and to output a high level signal to the gate of the first switch transistor when the difference between the common voltage and the reference voltage is less than the preset threshold value; or the first switch transistor is a N type transistor, the comparator is configured to output a high level signal to the gate of the first switch transistor when the difference between the common voltage and the reference voltage is greater than or equal to the preset threshold value, and to output a low level signal to the gate of the first switch transistor when the difference between the common voltage and the reference voltage is less than the preset threshold value.

In one possible implementation, in the above-described common voltage compensation circuit according to embodiment of the present disclosure, the inversion module comprises a first inverter;

an input terminal of the first inverter is connected with the drain of the first switch transistor, and an output terminal of the first inverter is connected with an input terminal of the voltage regulation module.

In one possible implementation, in the above-described common voltage compensation circuit according to the embodiment of the present disclosure, the voltage regulation module comprises: a voltage input module, a voltage selecting module and a voltage output module; wherein, the voltage input module is configured to output a received signal sent by the first inverter to a first input terminal of the voltage selecting module, and to output a inverted signal of the received signal sent by the first inverter to a second input terminal of the voltage selecting module;

the voltage selecting module is configured to output a first reference signal to the voltage output module when the signal sent by the first inverter and received by the voltage input module is the second level signal, and to output a second reference signal to the voltage output module when the signal sent by the first inverter and received by the voltage input module is the zero voltage signal;

the voltage output module is configured to output the reference voltage to the common electrode line in the display panel when the first reference signal sent by the voltage selecting module is received, and to output the zero voltage signal to the common electrode line in the display panel when the second reference signal sent by the voltage selecting module is received.

In one possible implementation, in the above-described common voltage compensation circuit according to the embodiment of the present disclosure, the voltage input module comprises a second inverter;

an input terminal of the second inverter is connected with the output terminal of the first inverter and a first input terminal of the voltage selecting module respectively; and an output terminal of the second inverter is connected with a second input terminal of the voltage selecting module.

In one possible implementation, in the above-described common voltage compensation circuit according to the embodiment of the present disclosure, the voltage selecting module comprises a second switch transistor and a third switch transistor having a same doping polarity as well as a fourth switch transistor and a fifth switch transistor having a same doping polarity; wherein, a gate of the second switch transistor is connected with the output terminal of the first inverter and the input terminal of the second inverter respectively, a source of the second switch transistor is connected with a first reference signal terminal, and a drain of the second switch transistor is connected with a first node;

a gate of the third switch transistor is connected with the output terminal of the second inverter, a source of the third switch transistor is connected with the first reference signal terminal, and a drain of the third switch transistor is connected with a second node;

a gate of the fourth switch transistor is connected with the second node, a source of the fourth switch transistor is connected with a second reference signal terminal, a drain of the fourth switch transistor is connected with the first node;

a gate of the fifth switch transistor is connected with the first node, a source of the fifth switch transistor is connected with the second reference signal terminal, and a drain of the fifth switch transistor is connected with the second node.

In one possible implementation, in the above-described common voltage compensation circuit according to the embodiment of the present disclosure, the first reference signal terminal is used for outputting a low level signal, the second reference signal terminal is used for outputting a high level signal, and the fourth switch transistor and the fifth switch transistor are P type transistors; or, the first reference signal terminal is used for outputting a high level signal, the second reference signal terminal is used for outputting a low level signal, and the fourth switch transistor and the fifth switch transistor are N type transistors.

In one possible implementation, in the above-described common voltage compensation circuit according to the embodiment of the present disclosure, the voltage output module comprises: a sixth switch transistor and a seventh switch transistor having opposite polarities; wherein, a the gate of the sixth switch transistor is connected with the first node, a source of the sixth switch transistor is connected with the port for inputting the reference voltage, and a drain of the sixth switch transistor is connected with a drain of the seventh switch transistor and the common electrode line in the display panel respectively;

a gate of the seventh switch transistor is connected with the first node, and a source of the seventh switch transistor is grounded.

In one possible implementation, in the above-described common voltage compensation circuit according to the embodiment of the present disclosure, the sixth switch transistor is a P type transistor, and the seventh switch transistor is a N type transistor when the second switch transistor and the third switch transistor are the N type transistors and the first reference signal terminal is used for outputting the low level signal, the second reference signal terminal is used for outputting the high level signal, or when the second switch transistor and the third switch transistor are the P type transistors, and the first reference signal terminal is used for outputting the high level signal, the second reference signal terminal is used for outputting the low level signal;

the sixth switch transistor is the N type transistor, and the seventh switch transistor is the P type transistor, when the second switch transistor and the third switch transistor are the P type transistors and the first reference signal terminal is used for outputting the low level signal, the second reference signal terminal is used for outputting the high level signal, or when the second switch transistor and the third switch transistor are the N type transistors, and the first reference signal terminal is used for outputting the high level signal, the second reference signal terminal is used for outputting the low level signal.

An embodiment of the present disclosure further provides an array substrate, comprising: a common electrode line located in a display region, and a common voltage generation circuit and the above-described common voltage compensation circuit according to the embodiment of the present disclosure which are located in a non-display region and are connected with the common electrode line.

An embodiment of the present disclosure further provides a display apparatus, comprising the above-described array substrate according to the embodiment of the present disclosure.

An embodiment of the present disclosure further provides a compensating method of a common voltage compensation circuit, comprising:

comparing, by a comparison module, a common voltage loaded on a common electrode line in a display panel with a reference voltage; outputting a zero voltage signal to an inversion module when a difference between the common voltage and the reference voltage is greater than or equal to a preset threshold value; and outputting a first level signal to the inversion module when the difference between the common voltage and the reference voltage is less than the preset threshold value;

outputting, by the inversion module, a second level signal to a voltage regulation module when the zero voltage signal sent by the comparison module is received; and outputting the zero voltage signal to the voltage regulation module when the first level signal sent by the comparison module is received;

outputting, by the voltage regulation module, the reference voltage to the common electrode line in the display panel when the second level signal sent by the inversion module is received; and outputting the zero voltage signal to the common electrode line in the display panel when the zero voltage signal sent by the inversion module is received.

In the common voltage compensation circuit, the compensating method thereof, the array substrate and the display apparatus according to the embodiments of the present disclosure as described above, when the difference between the common voltage on the common electrode line and the reference voltage is great, the comparison module outputs the zero voltage signal to the inversion module, the inversion module outputs the second level signal to the voltage regulation module, the voltage regulation module outputs the reference voltage to the common electrode line, and the common voltage on the common electrode line is compensated by the common voltage compensation circuit, so that the common voltage on the common electrode line is equal to the reference voltage; when the difference between the common voltage on the common electrode line and the reference voltage is small, the comparison module outputs the first level signal to the inversion module, the inversion module outputs the zero voltage signal to the voltage regulation module, the voltage regulation module outputs the zero voltage signal to the common electrode line, the common voltage on the common electrode line is not compensated by the common voltage compensation circuit, in this way, the common voltage on the common electrode line can be stabilized, thus a problem of abnormities occurred in the display picture of the display panel could be avoided.

DETAILED DESCRIPTION

Hereinafter, the detailed description of the common voltage compensation circuit, the compensating method thereof, the array substrate and the display apparatus provided by an embodiment of the present disclosure will be explained in detail with reference to the drawings.

Figure 1:
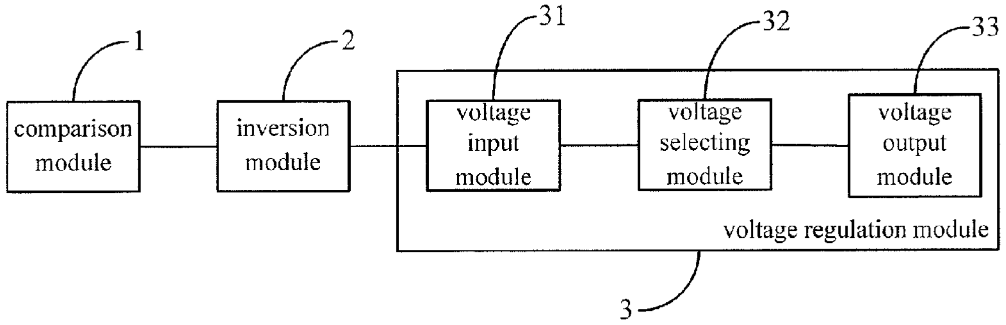
FIG. 1 is a structural representation of the common voltage compensation circuit according to an embodiment of the present disclosure.

As shown in FIG. 1, a common voltage compensation circuit according to an embodiment of the present disclosure comprises: a comparison module 1, an inversion module 2, and a voltage regulation module 3.

The comparison module 1 compares a common voltage loaded on a common electrode line in a display panel with a reference voltage, outputs a zero voltage signal to the inversion module 2 when a difference between the common voltage and the reference voltage is greater than or equal to a preset threshold value, and outputs a first level signal to the inversion module 2 when the difference between the common voltage and the reference voltage is less than the preset threshold value.

The inversion module 2 outputs a second level signal to the voltage regulation module 3 when the zero voltage signal sent by the comparison module 1 is received, and outputs the zero voltage signal to the voltage regulation module 3 when the first level signal sent by the comparison module 1 is received.

The voltage regulation module 3 outputs the reference voltage to the common electrode line in the display panel when the second level signal sent by the inversion module 2 is received, and outputs the zero voltage signal to the common electrode line in the display panel when the zero voltage signal sent by the inversion module 2 is received.

Figure 2:
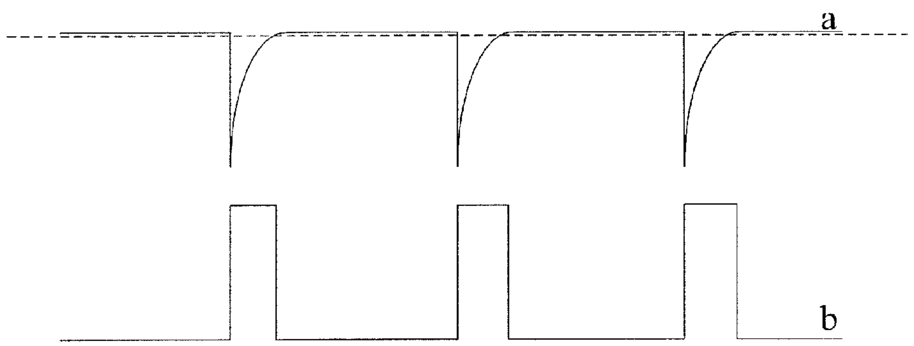
FIG. 2 is a waveform diagram after a common voltage on the common electrode line is compensated by the common voltage compensation circuit according to an embodiment of the present disclosure.

In the above-described common voltage compensation circuit according to the embodiment of the present disclosure, when the difference between the common voltage on the common electrode line and the reference voltage is great, for example, as shown in FIG. 2, when the common voltage on the common electrode line (as represented by a real line "a" shown in FIG. 2) is less than the reference voltage (as represented by a dotted line shown in FIG. 2) and the difference therebetween is greater than a preset threshold value, the comparison module 1 outputs the zero voltage signal to the inversion module 2, the inversion module 2 outputs the second level signal to the voltage regulation module 3, the voltage regulation module 3 outputs the reference voltage to the common electrode line (as represented by a real line "b" shown in FIG. 2), the common voltage on the common electrode line is compensated by the common voltage compensation circuit, so that the common voltage on the common electrode line is equal to the reference voltage; when the difference between the common voltage on the common electrode line and the reference voltage is small, the comparison module 1 outputs the first level signal to the inversion module 2, the inversion module 2 outputs the zero voltage signal to the voltage regulation module 3, the voltage regulation module 3 outputs the zero voltage signal to the common electrode line, and the common voltage on the common electrode line would not be compensated by the common voltage compensation circuit, in this way, the common voltage on the common electrode line can be stabilized, thus a problem of abnormities occurred in a display picture in the display panel could be avoided.

As implemented in particular, in the above-described common voltage compensation circuit according to the embodiment of the present disclosure, voltages of the first level signal and the second level signal are generally positive voltages.

As implemented in particular, in the above-described common voltage compensation circuit according to the embodiment of the present disclosure, as shown in FIG. 3 to FIG. 6, the comparison module 1 may specifically comprise:

a comparator A and a first switch transistor T1; wherein, a first input terminal $a_1$ of the comparator A is connected with a common electrode line Vcom in the display panel, a second input terminal $a_2$ of the comparator A is connected with a port $V_0$ for inputting the reference voltage, an output terminal $a_3$ of the comparator A is connected with a gate of the first switch transistor T1; a source of the first switch transistor T1 is grounded, a drain of the first switch transistor T1 is connected with an input terminal 2*a* of the inversion module 2 via a port E1 for inputting the first level signal.

In an example, in the above-described common voltage compensation circuit according to the embodiment of the present disclosure, as shown in FIG. 3 to FIG. 6, the comparison module 1 may specifically further comprises: a sampler S, and a control power supply P for controlling a periodical enabling of the sampler S; a input terminal $s_1$ of the sampler S is connected with the output terminal $a_3$ of the comparator A, a control terminal $s_2$ of the sampler S is connected with the control power supply P, an output terminal $s_3$ of the sampler S is connected with the gate of the first switch transistor T1; in this way, by arranging the sampler S and the control power supply P in the comparison module 1, a sampling frequency taken by the sampler S for a comparison result between the common voltage and the reference voltage obtained by the comparator A may be adjusted according to actual requirements, thereby a periodical sampling of the comparison result between the common voltage and the reference voltage obtained by the comparator A could be realized, and a signal outputted by the comparator A is outputted to the gate of the first switch transistor T1.

As implemented in particular, in the above-described common voltage compensation circuit according to the embodiment of the present disclosure, the first switch transistor T1 may be a N type transistor or a P type transistor, and there is no limitation on it. When the first switch transistor T1 is the P type transistor, the comparator A is specifically used for outputting a low level signal to the gate of the first switch transistor T1 when the difference between the common voltage and the reference voltage is greater than or equal to the preset threshold value, so that the first switch transistor T1 is in a turned-on state, and for outputting a high level signal to the gate of the first switch transistor T1 when the difference between the common voltage and the reference voltage is less than the preset threshold value, so that the first switch transistor T1 is turned off. When the first switch transistor T1 is the N type transistor, the comparator A is specifically used for outputting the high level signal to the gate of the first switch transistor T1 when the difference between the common voltage and the reference voltage is greater than or equal to the preset threshold value, so that the first switch transistor T1 is in the turned-on state, and for outputting the low level signal to the gate of the first switch transistor T1 when the difference between the common voltage and the reference voltage is less than the preset threshold value, so that the first switch transistor T1 is turned off. Each of FIG. 3 to FIG. 6 is explained by taking a case where the first switch transistor T1 is the N type transistor as an example.

In the common voltage compensation circuit according to the embodiment of the present disclosure, when the comparison module 1 specifically comprises the comparator A, the sampler S, the control power supply P and the first switch transistor T1 as described above, the operating principle of the comparison module 1 is as follows by taking the case where the first switch transistor T1 is the N type transistor. The control power supply P controls the sampler S to be enabled, the sampler S samples the comparison result between the common voltage and the reference voltage obtained by the comparator A, and when the difference between the common voltage and the reference voltage is greater than or equal to the preset threshold value, the comparator A inputs a high level signal to the gate of the first switch transistor T1 via the sampler S, so that the first switch transistor T1 is in the turned-on state, and the inversion module 2 and the port E1 for inputting the first level signal are grounded; when the difference between the common voltage and the reference voltage is less than the preset threshold value, the comparator A inputs a low level signal to the gate of the first switch transistor T1 via the sampler S, so that the first switch transistor T1 is turned off and the port E1 for inputting the first level signal outputs the first level signal to the inversion module 2.

As implemented in particular, in the above-described common voltage compensation circuit according to the embodiment of the present disclosure, as shown in FIG. 3 to FIG. 6, the inversion module 2 may specifically comprise a first inverter B1; an input terminal $b_{11}$ of the first inverter B1 is connected with the drain of the first switch transistor T1, an output terminal $b_{12}$ of the first inverter B1 is connected with a input terminal 3*a* of the voltage regulation module 3.

In the common voltage compensation circuit according to the embodiment of the present disclosure, when the inversion module 2 specifically comprises the first inverter B1 as described above, its operating principle is as follows. The first inverter B1 outputs the second level signal to the voltage regulation module 3 when the input terminal $b_{11}$ of the first inverter B is grounded; and the first inverter B1 outputs the zero voltage signal to the voltage regulation module 3 when the first inverter B1 received the first level signal sent by the port E1 for inputting the first level signal.

As implemented in particular, in the above-described common voltage compensation circuit according to the embodiment of the present disclosure, as shown in FIG. 1, the voltage regulation module 3 may specifically comprise: a voltage input module 31, a voltage selecting module 32 and a voltage output module 33.

The voltage input module 31 outputs the received signal sent by the first inverter B1 to a first input terminal 32*a* of the voltage selecting module 32, and outputs an inverted signal of the received signal sent by the first inverter B1 to a second input terminal 32*b* of the voltage selecting module 32.

The voltage selecting module 32 outputs a first reference signal to the voltage output module 33 when the signal sent by the first inverter B1 and received by the voltage input module 31 is the second level signal, and outputs a second reference signal to the voltage output module 33 when the signal sent by the first inverter B1 and received by the voltage input module 31 is the zero voltage signal;

The voltage output module 33 outputs the reference voltage to the common electrode line Vcom in the display panel when the first reference signal sent by the voltage selecting module 32 is received, and outputs the zero voltage signal to the common electrode line Vcom in the display panel when the second reference signal sent by the voltage selecting module 32 is received.

As implemented in particular, in the above-described common voltage compensation circuit according to the embodiment of the present disclosure, as shown in FIG. 3 to FIG. 6, the voltage input module 31 may specifically comprise a second inverter B2; an input terminal $b_{21}$ of the second inverter B2 is connected with the output terminal but of the first inverter B1 and a first input terminal 32*a* of the voltage selecting module 32 respectively; an output terminal $b_{22}$ of the second inverter B2 is connected with a second input terminal 32*b* of the voltage selecting module 32.

In the common voltage compensation circuit according to the embodiment of the present disclosure, when the voltage input module 31 in the voltage regulation module 3 specifically comprises the second inverter B2 as described above, its operating principle is as follows. The second inverter B2 converts the second level signal into the zero voltage signal and sends the same to the second input terminal 32*b* of the voltage selecting module 32 when the signal sent to the first input terminal 32*a* of the voltage selecting module 32 and the input terminal $b_{21}$ of the second inverter B2 from the first inverter B1 is the second level signal; and the second inverter B2 converts the zero voltage signal into the second level signal and sends the same to the second input terminal 32*b* of the voltage selecting module 32 when the signal sent to the first input terminal 32*a* of the voltage selecting module 32 and the input terminal $b_{21}$ of the second inverter B2 from the first inverter B1 is the zero voltage signal.

As implemented in particular, in the above-described common voltage compensation circuit according to the embodiment of the present disclosure, as shown in FIG. 3 to FIG. 6, the voltage selecting module 32 may specifically comprise a second switch transistor 12 and a third switch transistor T3 having a same doping polarity as well as a fourth switch transistor T4 and a fifth switch transistor T5 having a same doping polarity. Wherein, a gate of the second switch transistor T2 is connected with the output terminal $b_{12}$ of the first inverter B1 and the input terminal $b_{21}$ of the second inverter B2 respectively, a source of the second switch transistor T2 is connected with a first reference signal terminal Ref1, a drain of the second switch transistor T2 is connected with a first node a; a gate of the third switch transistor T3 is connected with the output terminal $b_{22}$ of the second inverter B2, a source of the third switch transistor T3 is connected with the first reference signal terminal Ref1, a drain of the third switch transistor T3 is connected with a second node b; a gate of the fourth switch transistor T4 is connected with the second node b, a source of the fourth switch transistor T4 is connected with a second reference signal terminal Ref2, a drain of the fourth switch transistor T4 is connected with the first node a; a gate of the fifth switch transistor T5 is connected with the first node a, a source of the fifth switch transistor T5 is connected with the second reference signal terminal Ref2, a drain of the fifth switch transistor T5 is connected with the second node b.

Figure 3:
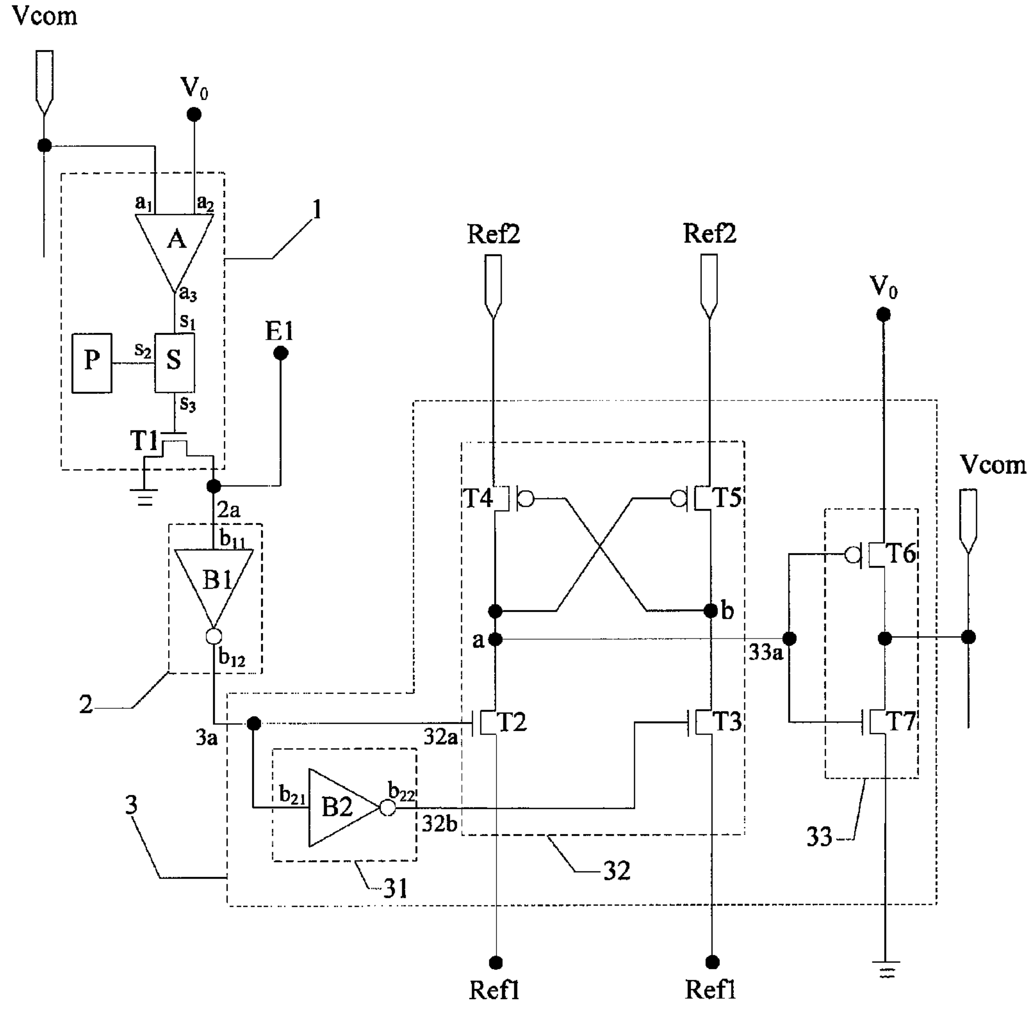
FIG. 3 to FIG. 6 are specific structural representations of the common voltage compensation circuit according to embodiments of the present disclosure respectively.
Figure 4:
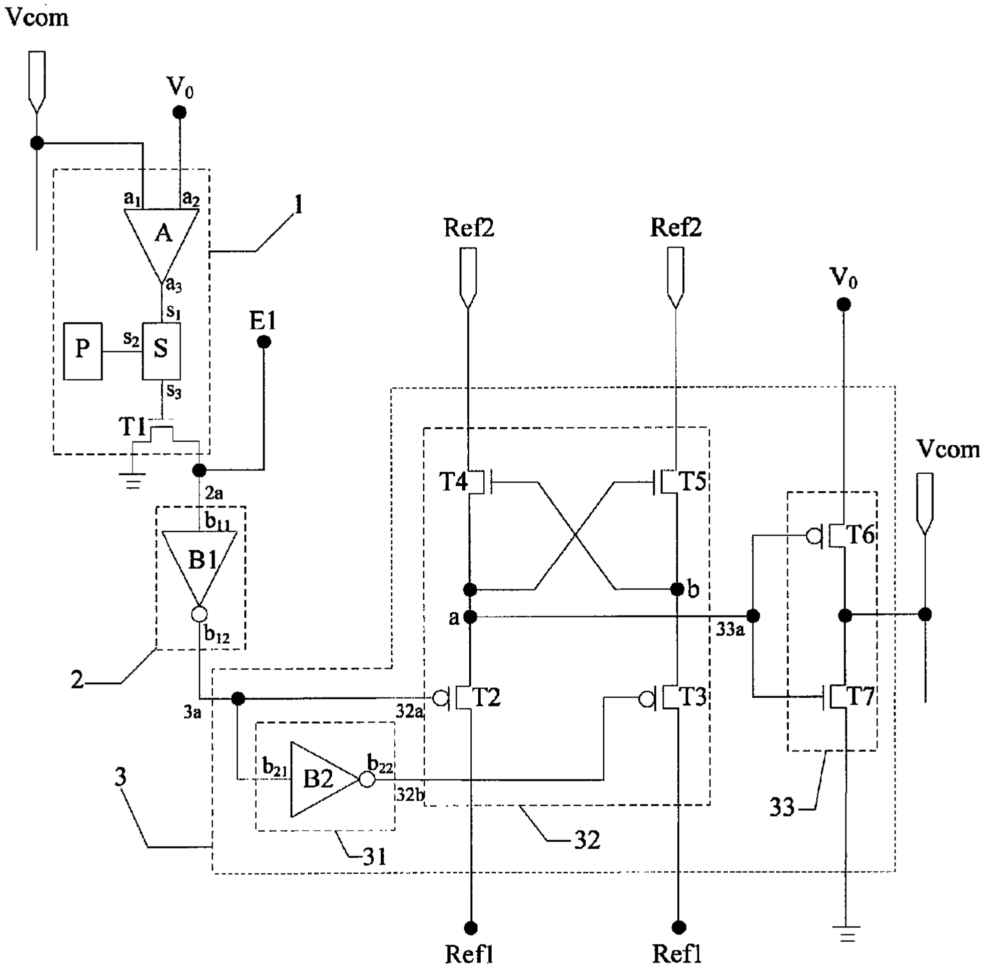
Figure 5:
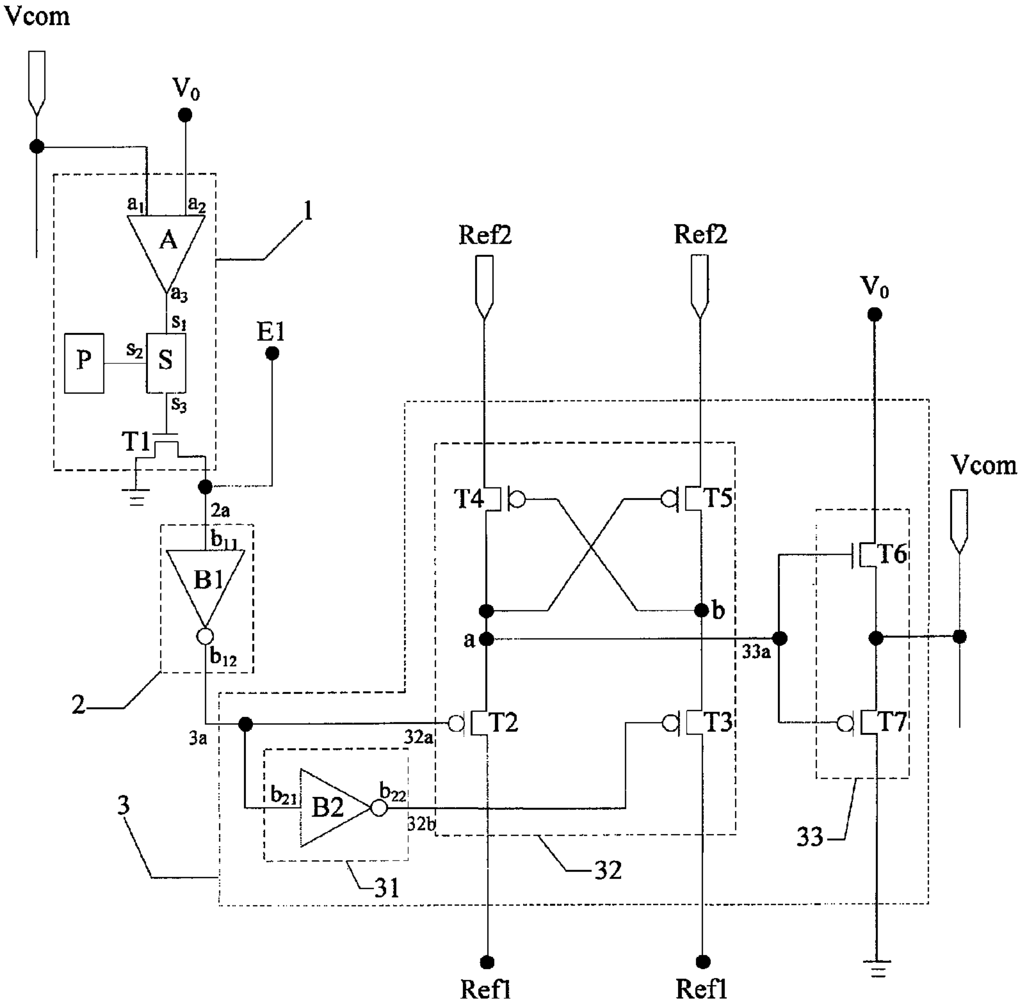

As implemented in particular, in the above-described common voltage compensation circuit according to the embodiment of the present disclosure, as shown in FIG. 3 and FIG. 5, the first reference signal terminal Ref1 is used for outputting a low level signal, the second reference signal terminal Ref2 is used for outputting a high level signal, the fourth switch transistor T4 and the fifth switch transistor T5 are the P type transistors. Alternatively, as shown in FIG. 4 and FIG. 6, the first reference signal terminal Ref1 is used for outputting the high level signal, the second reference signal terminal Ref2 is used for outputting the low level signal, the fourth switch transistor T4 and the fifth switch transistor T5 are the N type transistors.

Figure 6:
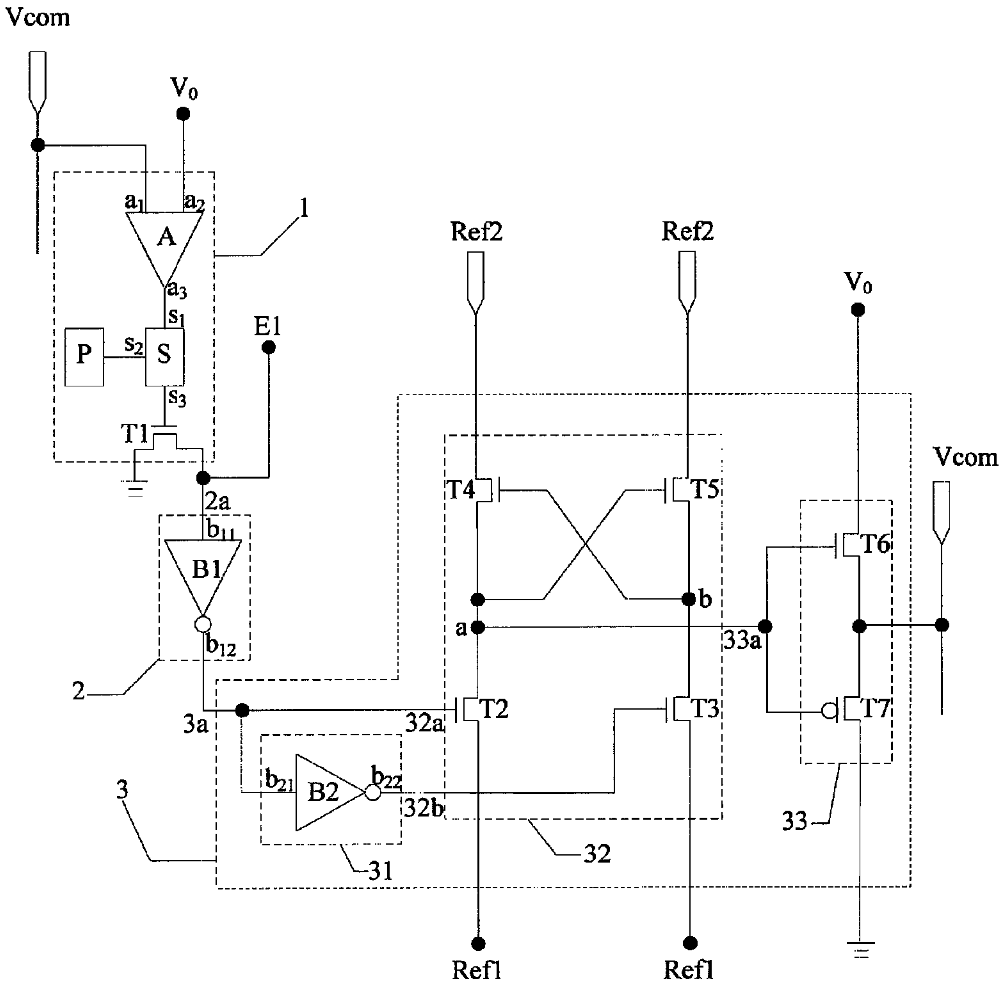

As implemented in particular, both the second switch transistor T2 and the third switch transistor T3 can be the N type transistors, as shown in FIG. 3 and FIG. 6. Alternatively, both of them can be the P type transistors, as shown in FIG. 4 and FIG. 5. There is no limitation on them.

In an example, in the common voltage compensation circuit according to the embodiment of the present disclosure, when the voltage selecting module 32 in the voltage regulation module 3 comprises the second switch transistor T2, the third switch transistor T3, the fourth switch transistor T4 and the fifth switch transistor T5 as described above, its operating principle of is as follows by taking a case where the second switch transistor T2 and the third switch transistor T3 are the N type transistors, the fourth switch transistor T4 and the fifth switch transistor T5 are the P type transistors, the first reference signal terminal Ref1 is used for outputting the low level signal and the second reference signal terminal Ref2 is used for outputting the high level signal as shown in FIG. 3 as an example. When the signal sent by the first inverter B1 and received by the gate of the second switch transistor T2 is the second level signal, and the signal sent by the second inverter B2 and received by the gate of the third switch transistor T3 is the zero voltage signal, the second switch transistor T2 is in the turned-on state, the third switch transistor T3 is turned off, the first reference signal terminal Ref1 outputs the low level signal to the gate of the fifth switch transistor T5 via the second switch transistor T2, the fifth switch transistor T5 is in the turned-on state, the second reference signal terminal Ref2 outputs the high level signal to the fourth switch transistor T4 via the fifth switch transistor T5, the fourth switch transistor T4 is turned off, the first reference signal terminal Ref1 outputs the low level signal to the input terminal 33*a* of the voltage output module 33 via the second switch transistor T2. When the signal sent by the first inverter B1 and received by the gate of the second switch transistor T2 is the zero voltage signal, and the signal sent by the second inverter B2 and received by the gate of the third switch transistor T3 is the second level signal, the second switch transistor T2 is turned off, the third switch transistor T3 is in the a state, the first reference signal terminal Ref1 outputs the low level signal to the gate of the fourth switch transistor T4 via the third switch transistor T3, the fourth switch transistor T4 is in the turned-on state, the second reference signal terminal Ref2 outputs the high level signal to the fifth switch transistor T5 via the fourth switch transistor T4, the fifth switch transistor T5 is turned off, the second reference signal terminal Ref2 outputs the high level signal to the input terminal 33*a* of the voltage output module 33 via the fourth switch transistor T4.

As implemented in particular, in the above-described common voltage compensation circuit according to the embodiment of the present disclosure, as shown in FIG. 3 to FIG. 6, the voltage output module 33 may specifically comprise: a sixth switch transistor T6 and a seventh switch transistor T7 having opposite polarities; wherein, a gate of the sixth switch transistor T6 is connected with the first node a, a source of the sixth switch transistor T6 is connected with the port $V_0$ for inputting the reference voltage, a drain of the sixth switch transistor T6 is connected with a drain of the seventh switch transistor T7 and the common electrode line Vcom in the display panel respectively; a gate of the seventh switch transistor T7 is connected with the first node a, and a source of the seventh switch transistor T7 is grounded.

As implemented in particular, in the above-described common voltage compensation circuit according to the embodiment of the present disclosure, the sixth switch transistor T6 is the P type transistor, the seventh switch transistor T7 is the N type transistor, when the second switch transistor T2 and the third switch transistor T3 are the N type transistors, and the first reference signal terminal Ref1 is used for outputting the low level signal, the second reference signal terminal Ref2 is used for outputting the high level signal, as shown in FIG. 3, or, when the second switch transistor T2 and the third switch transistor T3 are the P type transistors, and the first reference signal terminal Ref1 is used for outputting the high level signal, the second reference signal terminal Ref2 is used for outputting the low level signal, as shown in FIG. 4. The sixth switch transistor T6 is the N type transistor and the seventh switch transistor T7 is the P type transistor when the second switch transistor T2 and the third switch transistor T3 are the P type transistors, and the first reference signal terminal Ref1 is used for outputting the low level signal, the second reference signal terminal Ref2 is used for outputting the a high level signal, as shown in FIG. 5, or, when the second switch transistor T2 and the third switch transistor T3 are the N type transistors, and the first reference signal terminal Ref1 is used for outputting the high level signal, the second reference signal terminal Ref2 is used for outputting the low level signal, as shown in FIG. 6.

In an example, in the common voltage compensation circuit according to the embodiment of the present disclosure, when the voltage output module 33 in the voltage regulation module 3 comprises the sixth switch transistor T6 and the seventh switch transistor T7 as described above, its operating principle is as follows by taking a case where the sixth switch transistor T6 is the P type transistor and the seventh switch transistor T7 is the N type transistor as an example. When the first reference signal terminal Ref1 outputs the low level signal to the gate of the sixth switch transistor T6 and the gate of the seventh switch transistor T7 via the second switch transistor T2, the sixth switch transistor T6 is in the turned-on state, the seventh switch transistor T7 is turned off, the port $V_0$ for inputting the reference voltage outputs the reference voltage to the common electrode line Vcom in the display panel via the sixth switch transistor T6. When the second reference signal terminal Ref1 outputs the high level signal to the gate of the sixth switch transistor T6 and the gate of the seventh switch transistor T7 via the fourth switch transistor T4, the sixth switch transistor T6 is turned off, the seventh switch transistor T7 is in the on state, the common electrode line Vcom in the display panel is grounded.

It should be noted that, the switch transistors mentioned in the above-described embodiments may be thin film transistors (TFTs), and may also be metal oxide semiconductor field effect tubes (MOSs), and there is no limitation on it. In a specific implementation, the sources and the drains of these transistors can be exchangeable without being distinguished from each other. Various specific embodiments are explained by taking a case where all the switch transistors are the thin film transistors as an example.

Hereinafter, the operating principle of the common voltage compensation circuit will be explained with respect to four specific examples as shown in FIG. 3 to FIG. 6.

EXAMPLE ONE

As shown in FIG. 3, the control power supply P controls the enabling of the sampler S, the sampler S samples the comparison result between the common voltage and the reference voltage obtained by the comparator A.

When the difference between the common voltage and the reference voltage is greater than or equal to the preset threshold value, the comparator A inputs the high level signal to the gate of the first switch transistor T1 via the sampler S, so that the first switch transistor T1 is in the turned-on state and the input terminal $b_{11}$ of the first inverter B1 and the port E1 for inputting a first level signal are grounded; the first inverter B1 outputs the second level signal to the gate of the second switch transistor T2 and the input terminal $b_{21}$ of the second inverter B2, the second inverter B2 converts the second level signal into $_a$ zero voltage signal and sends the same to the gate of the third switch transistor T3, the second switch transistor T2 is in the turned-on state, the third switch transistor T3 is turned off, the first reference signal terminal Ref1 outputs the low level signal to the gate of the fifth switch via the second switch transistor T2, the fifth switch transistor T5 is in the turned-on state, the second reference signal terminal Ref2 outputs the high level signal to the fourth switch transistor T4 via the fifth switch transistor T5, the fourth switch transistor T4 is turned off, the first reference signal terminal Ref1 outputs the low level signal to the gate of the sixth switch transistor T6 and the gate of the seventh switch transistor T7 via the second switch transistor T2, the sixth switch transistor T6 is in the turned-on state, the seventh switch transistor T7 is turned off, the port $V_0$ for inputting the reference voltage outputs the reference voltage to the common electrode line Vcom in the display panel via the sixth switch transistor T6.

When the difference between the common voltage and the reference voltage is less than the preset threshold value, the comparator A inputs the low level signal to the gate of the first switch transistor T1 via the sampler S, so that the first switch transistor T1 is turned off and the port E1 for inputting the first level signal sends the first level signal to the input terminal $b_{11}$ of the first inverter B1; the first inverter B1 outputs the zero voltage signal to the gate of the second switch transistor T2 and the input terminal $b_{21}$ of the second inverter B2, the second inverter B2 converts the zero voltage signal into the second level signal and sends the same to the gate of the third switch transistor T3, the second switch transistor T2 is turned off, the third switch transistor T3 is in the turned-on state, the first reference signal terminal Ref1 outputs the low level signal to the fourth switch transistor T4 via the third switch transistor T3, the fourth switch transistor T4 is in the turned-on state, the second reference signal terminal Ref2 outputs the high level signal to the fifth switch transistor T5 via the fourth switch transistor T4, the fifth switch transistor T5 is turned off, the second reference signal terminal Ref2 outputs the high level signal to the gate of the sixth switch transistor T6 and the gate of the seventh switch transistor T7 via the fourth switch transistor T4, the sixth switch transistor T6 is turned off, the seventh switch transistor T7 is in the turned-on state, so that the common electrode line in the display panel is grounded.

EXAMPLE TWO

As shown in FIG. 4, the control power supply P controls the enabling of the sampler S, the sampler S samples the comparison result between the common voltage and the reference voltage obtained by the comparator A.

When the difference between the common voltage and the reference voltage is greater than or equal to the preset threshold value, the comparator A inputs the high level signal to the gate of the first switch transistor T1 via the sampler S, so that the first switch transistor T1 is in the turned-on state and the input terminal $b_{11}$ of the first inverter B1 and the port E1 for inputting the first level signal are grounded; the first inverter B1 outputs the second level signal to the gate of the second switch transistor T2 and the input terminal $b_{21}$ of the second inverter B2, the second inverter B2 converts the second level signal into the zero voltage signal and sends the same to the gate of the third switch transistor T3, the second switch transistor T2 is turned off, the third switch transistor T3 is in the turned-on state, the first reference signal terminal Ref1 outputs the high level signal to the gate of the fourth switch transistor T4 via the third switch transistor T3, the fourth switch transistor T4 is in the turned-on state, the second reference signal terminal Ref2 outputs the high level signal to the fifth switch transistor T5 via the fourth switch transistor T4, the fifth switch transistor T5 is turned off, the second reference signal terminal Ref2 outputs the low level signal to the gate of the sixth switch transistor T6 and the gate of the seventh switch transistor T7 via the fourth switch transistor T4, the sixth switch transistor T6 is in the turned-on state, the seventh switch transistor T7 is turned off, the port V0 for inputting the reference voltage outputs the reference voltage to the common electrode line Vcom in the display panel via the sixth switch transistor T6.

When the difference between the common voltage and the reference voltage is less than the preset threshold value, the comparator A inputs the low level signal to the gate of the first switch transistor T1 via the sampler S, so that the first switch transistor T1 is turned off and the port E1 for inputting the first level signal sends the first level signal to the input terminal $b_{11}$ of the first inverter B1; the first inverter B1 outputs the zero voltage signal to the gate of the second switch transistor T2 and the input terminal $b_{21}$ of the second inverter B2, the second inverter B2 converts the zero voltage signal into the second level signal and sends the same to the gate of the third switch transistor T3, the second switch transistor T2 is in the turned-on state, the third switch transistor T3 is turned off, the first reference signal terminal Ref1 outputs the high level signal to the gate of the fifth switch transistor T5 via the second switch transistor T2, the fifth switch transistor T5 is in the turned-on state, the second reference signal terminal Ref2 outputs the low level signal to the fourth switch transistor T4 via the fifth switch transistor T5, the fourth switch transistor T4 is turned off, the first reference signal terminal Ref1 outputs the high level signal to the gate of the sixth switch transistor T6 and the gate of the seventh switch transistor T7 via the second switch transistor T2, the sixth switch transistor T6 is turned off, the seventh switch transistor T7 is in the turned-on state, so that the common electrode line $V_{com}$ in the display panel is grounded.

EXAMPLE THREE

As shown in FIG. 5, the control power supply P controls the enabling of the sampler S, the sampler S samples the comparison result between the common voltage and the reference voltage obtained by the comparator A.

When the difference between the common voltage and the reference voltage is greater than or equal to the preset threshold value, the comparator A inputs the high level signal to the gate of the first switch transistor T1 via the sampler S, so that the first switch transistor T1 is in the turned-on state and the input terminal $b_{11}$ of the first inverter B1 and the port E1 for inputting the first level signal are grounded; the first inverter B1 outputs the second level signal to the gate of the second switch transistor T2 and the input terminal $b_{21}$ of the second inverter B2, the second inverter B2 converts the second level signal into the zero voltage signal and sends the same to the gate of the third switch transistor T3, the second switch transistor T2 is turned off, the third switch transistor T3 is in the turned-on state, the first reference signal terminal Ref1 outputs the low level signal to the gate of the fourth switch transistor T4 via the third switch transistor T3, the fourth switch transistor T4 is in the turned-on state, the second reference signal terminal Ref2 outputs the high level signal to the fifth switch transistor T5 via the fourth switch transistor T4, the fifth switch transistor T5 is turned off, the second reference signal terminal Ref2 outputs the high level signal to the gate of the sixth switch transistor T6 and the gate of the seventh switch transistor T7 via the fourth switch transistor T4, the sixth switch transistor T6 is in the turned-on state, the seventh switch transistor T7 is turned off, the port V0 for inputting the reference voltage outputs the reference voltage to the common electrode line $V_{com}$ in the display panel via the sixth switch transistor T6.

When the difference between the common voltage and the reference voltage is less than the preset threshold value, the comparator A inputs the low level signal to the gate of the first switch transistor T1 via the sampler S, so that the first switch transistor T1 is turned off and the port E1 for inputting the first level signal sends the first level signal to the input terminal $b_{11}$ of the first inverter B1; the first inverter B1 outputs the zero voltage signal to the gate of the second switch transistor T2 and the input terminal $b_{21}$ of the second inverter B2, the second inverter B2 converts the zero voltage signal into the second level signal and sends the same to the gate of the third switch transistor T3, the second switch transistor T2 is in the turned-on state, the third switch transistor T3 is turned off, the first reference signal terminal Ref1 outputs the low level signal to the gate of the fifth switch transistor T5 via the second switch transistor T2, the fifth switch transistor T5 is in the turned-on state, the second reference signal terminal Ref1 outputs the high level signal to the fourth switch transistor T4 via the fifth switch transistor T5, the fourth switch transistor T4 is turned off, the first reference signal terminal Ref1 outputs the low level signal to the gate of the sixth switch transistor T6 and the gate of the seventh switch transistor T7 via the second switch transistor T2, the sixth switch transistor T6 is turned off, the seventh switch transistor T7 is in the turned-on state, so that the common electrode line $V_{com}$ in the display panel is grounded.

EXAMPLE FOUR

As shown in FIG. 6, the control power supply P controls the enabling of the sampler S, the sampler S samples the comparison result between the common voltage and the reference voltage obtained by the comparator A.

When the difference between the common voltage and the reference voltage is greater than or equal to the preset threshold value, the comparator A inputs the high level signal to the gate of the first switch transistor T1 via the sampler S, so that the first switch transistor T1 is in the turned-on state and the input terminal $b_{11}$ of the first inverter B1 and the port E1 for inputting the first level signal are grounded; the first inverter B1 outputs the second level signal to the gate of the second switch transistor T2 and the input terminal $b_{21}$ of the second inverter B2, the second inverter B2 converts the second level signal into the zero voltage signal and sends the same to the gate of the third switch transistor T3, the second switch transistor T2 is in the turned-on state, the third switch transistor T3 is turned off, the first reference signal terminal Ref1 outputs the high level signal to the gate of the fifth switch transistor T5 via the second switch transistor T2, the fifth switch transistor T5 is in the turned-on state, the second reference signal terminal Ref1 outputs the low level signal to the fourth switch transistor T4 via the fifth switch transistor T5, the fourth switch transistor T4 is turned off, the first reference signal terminal Ref1 outputs the high level signal to the gate of the sixth switch transistor T6 and the gate of the seventh switch transistor T7 via the second switch transistor 12, the sixth switch transistor T6 is in the turned-on state, the seventh switch transistor T7 is turned off, the port V0 for inputting the reference voltage outputs the reference voltage to the common electrode line $V_{com}$, in the display panel via the sixth switch transistor T6.

When the difference between the common voltage and the reference voltage is less than the preset threshold value, the comparator A inputs a low level signal to the gate of the first switch transistor T1 via the sampler S, so that the first switch transistor T1 is turned off and the port E1 for inputting the first level signal sends the first level signal to the input terminal $b_{11}$ of the first inverter B1; the first inverter B1 outputs the zero voltage signal to the gate of the second switch transistor T2 and the input terminal $b_{21}$ of the second inverter B2, the second inverter B2 converts the zero voltage signal into the second level signal and sends the same to the gate of the third switch transistor T3, the second switch transistor T2 is turned off, the third switch transistor T3 is in the turned-on state, the first reference signal terminal Ref1 outputs the high level signal to the gate of the fourth switch transistor T4 via the third switch transistor T3, the fourth switch transistor T4 is in the turned-on state, the second reference signal terminal Ref2 outputs the low level signal to the fifth switch transistor T5 via the fourth switch transistor T4, the fifth switch transistor T5 is turned off, the second reference signal terminal Ref2 outputs the low level signal to the gate of the sixth switch transistor T6 and the gate of the seventh switch transistor T7 via the fourth switch transistor T4, the sixth switch transistor T6 is turned off, the seventh switch transistor T7 is in the turned-on state, so that the common electrode line Vcom in the display panel is grounded.

Based on the same inventive concept, another embodiment of the present disclosure further provides an array substrate, comprising: a common electrode line in the display region, and a common voltage generation circuit and the above-described common voltage compensation circuit according to the embodiments of the present disclosure which are located in a non-display region and are connected with the common electrode line. Implementation of the array substrate can be referred to the embodiments of the common voltage compensation circuit as described above, the repetitive parts will be omitted.

It should be noted that, the above-described array substrate according to the embodiments of the present disclosure may specifically be an array substrate in a liquid crystal display, and may also be an array substrate in an organic electroluminescent display, but the present disclosure is not limited thereto.

Based on the same inventive concept, a further embodiment of the present disclosure further provides a display apparatus comprising the above-described array substrate according to the embodiments of the present disclosure, the display apparatus may be any products or components having a function of displaying such as a handset, a tablet computer, a TV set, a display, a notebook computer, a digital frame, and a navigator etc. The implementation of the display apparatus can be referred to the embodiments of the array substrate as described above, the repetitive parts will be omitted.

Figure 7:
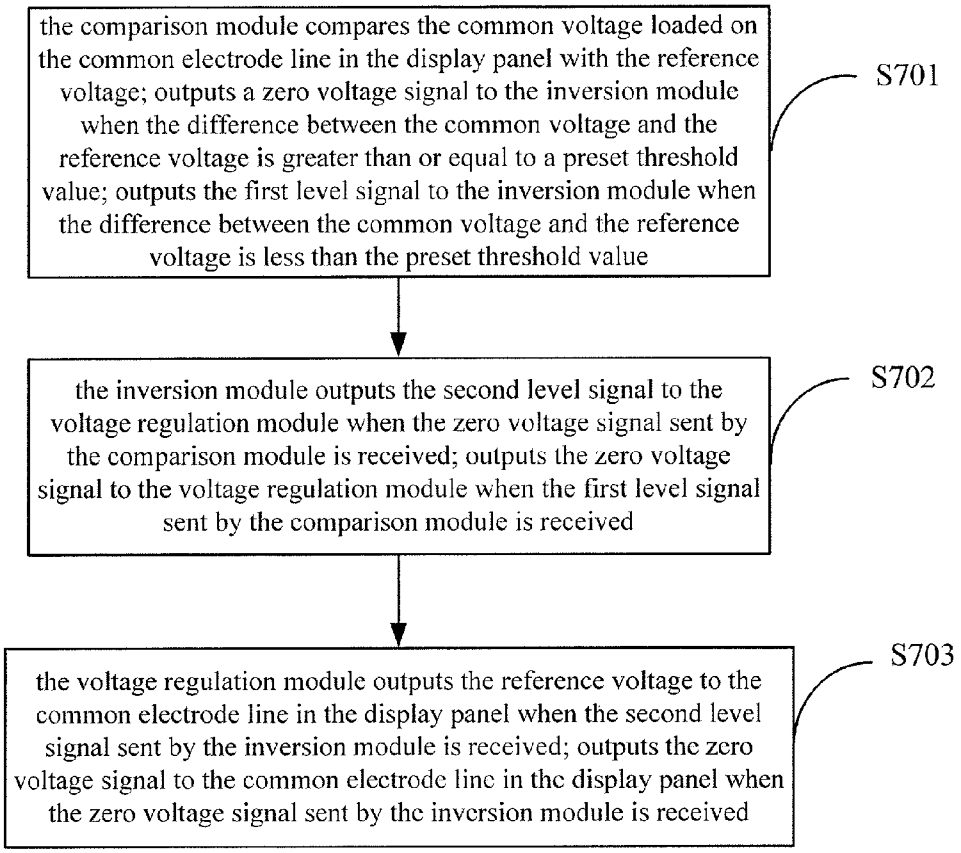
FIG. 7 is a flow diagram of a compensating method of the common voltage compensation circuit according to an embodiment of the present disclosure.

Base on the same inventive concept, a still embodiment of the present disclosure further provides a compensating method of the common voltage compensation circuit as shown in FIG. 7, the method specifically comprises following steps.

S701: the comparison module compares the common voltage loaded on the common electrode line in the display panel with the reference voltage; outputs the zero voltage signal to the inversion module when the difference between the common voltage and the reference voltage is greater than or equal to the preset threshold value; outputs the first level signal to the inversion module when the difference between the common voltage and the reference voltage is less than the preset threshold value.

S702: the inversion module outputs the second level signal to the voltage regulation module when the zero voltage signal sent by the comparison module is received; outputs the zero voltage signal to the voltage regulation module when the first level signal sent by the comparison module is received.

S703: the voltage regulation module outputs the reference voltage to the common electrode line in the display panel when the second level signal sent by the inversion module is received; outputs the zero voltage signal to the common electrode line in the display panel when the zero voltage signal sent by the inversion module is received.

The specific implementation of the above-described compensating method provided by an embodiment of the present disclosure can be referred to the embodiments of the common voltage compensation circuit as described above, the repetitive parts will be omitted.

In the common voltage compensation circuit, the compensating method thereof, the array substrate and the display apparatus according to the embodiments of the present disclosure as described above, when the difference between the common voltage on the common electrode line and the reference voltage is great, the comparison module outputs the zero voltage signal to the inversion module, the inversion module outputs the second level signal to the voltage regulation module, the voltage regulation module outputs the reference voltage to the common electrode line, the common voltage on the common electrode line is compensated by the common voltage compensation circuit, so that the common voltage on the common electrode line is equal to the reference voltage; when the difference between the common voltage on the common electrode line and the reference voltage is small, the comparison module outputs the first level signal to the inversion module, the inversion module outputs the zero voltage signal to the voltage regulation module, the voltage regulation module outputs the zero voltage signal to the common electrode line, the common voltage on the common electrode line is not compensated by the common voltage compensation circuit, in this way, the common voltage on the common electrode line can be stabilized, thus the problem of abnormities in the display picture of in the display panel could be avoided.

Obviously, those skilled in the art may make various changes and variations on the present disclosure without departing from the spirit and scope of the present disclosure. Thus, the present disclosure intends to cover the changes and variations to the present disclosure if such changes and variations belong to the scope defined by the claims of the present disclosure and equivalence thereof.

What is claimed is:

1. A common voltage compensation circuit, comprising: a comparison sub-circuit, an inversion sub-circuit, and a voltage regulation sub-circuit; wherein, the comparison sub-circuit is configured to compare a common voltage loaded on a common electrode line in a display panel with a reference voltage; to output a zero voltage signal to the inversion sub-circuit when a difference between the common voltage and the reference voltage is greater than or equal to a preset threshold value; and to output a first level signal to the inversion sub-circuit when the difference between the common voltage and the reference voltage is less than the preset threshold value;

the inversion sub-circuit is configured to output a second level signal to the voltage regulation sub-circuit when the zero voltage signal sent by the comparison sub-circuit is received; and to output the zero voltage signal to the voltage regulation sub-circuit when the first level signal sent by the comparison sub-circuit is received; and the voltage regulation sub-circuit is configured to output the reference voltage to the common electrode line in the display panel when the second level signal sent by the inversion sub-circuit is received; and to output the zero voltage signal to the common electrode line in the display panel when the zero voltage signal sent by the inversion sub-circuit is received.

2. The common voltage compensation circuit as claimed in claim 1, wherein the comparison sub-circuit comprises: a comparator and a first switch transistor; wherein, a first input terminal of the comparator is connected with the common electrode line in the display panel, a second input terminal of the comparator is connected with a port for inputting the reference voltage, and an output terminal of the comparator is connected with a gate of the first switch transistor; and a source of the first switch transistor is grounded, and a drain of the first switch transistor is connected with an input terminal of the inversion sub-circuit via a port for inputting the first level signal.

3. The common voltage compensation circuit as claimed in claim 2, wherein the comparison sub-circuit further comprises: a sampler, and a control power supply for controlling a periodical enabling of the sampler;

an input terminal of the sampler is connected with the output terminal of the comparator, a control terminal of the sampler is connected with the control power supply, and an output terminal of the sampler is connected with the gate of the first switch transistor.

4. The common voltage compensation circuit as claimed in claim 2, wherein, when the first switch transistor is a P type transistor, the comparator outputs a low level signal to the gate of the first switch transistor when the difference between the common voltage and the reference voltage is greater than or equal to the preset threshold value, and outputs a high level signal to the gate of the first switch transistor when the difference between the common voltage and the reference voltage is less than the preset threshold value; and When the first switch transistor is a N type transistor, the comparator outputs the high level signal to the gate of the first switch transistor when the difference between the common voltage and the reference voltage is greater than or equal to the preset threshold value, and outputs the low level signal to the gate of the first switch transistor when the difference between the common voltage and the reference voltage is less than the preset threshold value.

5. The common voltage compensation circuit as claimed in claim 2, wherein the inversion sub-circuit comprises a first inverter;

an input terminal of the first inverter is connected with the drain of the first switch transistor, and an output terminal of the first inverter is connected with an input terminal of the voltage regulation sub-circuit.

6. The common voltage compensation circuit as claimed in claim 5, wherein the voltage regulation sub-circuit comprises: a voltage input sub-circuit, a voltage selecting sub-circuit and a voltage output sub-circuit; wherein, the voltage input sub-circuit is configured to output the received signal sent by the first inverter to a first input terminal of the voltage selecting sub-circuit, and to output an inverted signal of the received signal sent by the first inverter to a second input terminal of the voltage selecting sub-circuit;

the voltage selecting sub-circuit is configured to outputs a first reference signal to the voltage output sub-circuit when the signal sent by the first inverter and received by the voltage input sub-circuit is the second level signal; and to output a second reference signal to the voltage output sub-circuit when the signal sent by the first inverter and received by the voltage input s sub-circuit is the zero voltage signal;

the voltage output sub-circuit is configured to output the reference voltage to the common electrode line in the display panel when the first reference signal sent by the voltage selecting sub-circuit is received; and to output the zero voltage signal to the common electrode line in the display panel when the second reference signal sent by the voltage selecting sub-circuit is received.

7. The common voltage compensation circuit as claimed in claim 6, wherein the voltage input sub-circuit comprises a second inverter;

an input terminal of the second inverter is connected with the output terminal of the first inverter and a first input terminal of the voltage selecting sub-circuit respectively; and an output terminal of the second inverter is connected with a second input terminal of the voltage selecting sub-circuit.

8. The common voltage compensation circuit as claimed in claim 7, wherein the voltage selecting sub-circuit comprises a second switch transistor and a third switch transistor having a same doping polarity as well as a fourth switch transistor and a fifth switch transistor having a same doping polarity; wherein, a gate of the second switch transistor is connected with the output terminal of the first inverter and the input terminal of the second inverter respectively, a source of the second switch transistor is connected with a first reference signal terminal, and a drain of the second switch transistor is connected with a first node;

a gate of the third switch transistor is connected with the output terminal of the second inverter, a source of the third switch transistor is connected with the first reference signal terminal, and a drain of the third switch transistor is connected with a second node;

a gate of the fourth switch transistor is connected with the second node, a source of the fourth switch transistor is connected with a second reference signal terminal, a drain of the fourth switch transistor is connected with the first node; and a gate of the fifth switch transistor is connected with the first node, a source of the fifth switch transistor is connected with the second reference signal terminal, and a drain of the fifth switch transistor is connected with the second node.

9. The common voltage compensation circuit as claimed in claim 8, wherein the fourth switch transistor and the fifth switch transistor are P type transistors, the first reference signal terminal is used for outputting the low level signal and the second reference signal terminal is used for outputting the high level signal; or the fourth switch transistor and the fifth switch transistor are N type transistors when the first reference signal terminal is used for outputting the high level signal and the second reference signal terminal is used for outputting the low level signal.

10. The common voltage compensation circuit as claimed in claim 9, wherein the voltage output sub-circuit specifically comprising: a sixth switch transistor and a seventh switch transistor having opposite polarities; wherein, a gate of the sixth switch transistor is connected with the first node, a source of the sixth switch transistor is connected with the port for inputting the reference voltage, and a drain of the sixth switch transistor is connected with a drain of the seventh switch transistor and the common electrode line in the display panel respectively; and a gate of the seventh switch transistor is connected with the first node, and a source of the seventh switch transistor is grounded.

11. The common voltage compensation circuit as claimed in claim 10, wherein, the sixth switch transistor is the P type transistor and the seventh switch transistor is the N type transistor, the second switch transistor and the third switch transistor are the N type transistors, the first reference signal terminal is used for outputting the low level signal, and the second reference signal terminal is used for outputting a high level signal; or the sixth switch transistor is the P type transistor and the seventh switch transistor is the N type transistor, the second switch transistor and the third switch transistor are the P type transistors, the first reference signal terminal is used for outputting the high level signal, and the second reference signal terminal is used for outputting the low level signal; or the sixth switch transistor is the N type transistor and the seventh switch transistor is the P type transistor, the second switch transistor and the third switch transistor are the P type transistors, the first reference signal terminal is used for outputting the low level signal, and the second reference signal terminal is used for outputting the high level signal; or the sixth switch transistor is the N type transistor and the seventh switch transistor is the P type transistor, the second switch transistor and the third switch transistor are the N type transistors, the first reference signal terminal is used for outputting the high level signal, and the second reference signal terminal is used for outputting the low level signal.

12. An array substrate, characterized in that, comprising: a common electrode line in a display region, and a common voltage generation circuit and a common voltage compensation circuit which are located in a non-display region and are connected with the common electrode line, the common voltage compensation circuit comprises: a comparison sub-circuit, an inversion sub-circuit, and a voltage regulation sub-circuit; wherein, the comparison sub-circuit is configured to compare a common voltage loaded on a common electrode line in a display panel with a reference voltage; to output a zero voltage signal to the inversion sub-circuit when a difference between the common voltage and the reference voltage is greater than or equal to a preset threshold value; and to output a first level signal to the inversion sub-circuit when the difference between the common voltage and the reference voltage is less than the preset threshold value;

the inversion sub-circuit is configured to output a second level signal to the voltage regulation sub-circuit when the zero voltage signal sent by the comparison sub-circuit is received; and to output the zero voltage signal to the voltage regulation sub-circuit when the first level signal sent by the comparison sub-circuit is received; and the voltage regulation sub-circuit is configured to output the reference voltage to the common electrode line in the display panel when the second level signal sent by the inversion sub-circuit is received; and to output the zero voltage signal to the common electrode line in the display panel when the zero voltage signal sent by the inversion sub-circuit is received.

13. The array substrate as claimed in claim 12, wherein the comparison sub-circuit comprises: a comparator and a first switch transistor; wherein, a first input terminal of the comparator is connected with the common electrode line in the display panel, a second input terminal of the comparator is connected with a port for inputting the reference voltage, and an output terminal of the comparator is connected with a gate of the first switch transistor; and a source of the first switch transistor is grounded, and a drain of the first switch transistor is connected with an input terminal of the inversion sub-circuit via a port for inputting the first level signal.

14. The array substrate as claimed in claim 13, wherein the comparison sub-circuit further comprises: a sampler, and a control power supply for controlling a periodical enabling of the sampler;

an input terminal of the sampler is connected with the output terminal of the comparator, a control terminal of the sampler is connected with the control power supply, and an output terminal of the sampler is connected with the gate of the first switch transistor.

15. The array substrate as claimed in claim 13, wherein, when the first switch transistor is a P type transistor, the comparator outputs a low level signal to the gate of the first switch transistor when the difference between the common voltage and the reference voltage is greater than or equal to the preset threshold value, and outputs a high level signal to the gate of the first switch transistor when the difference between the common voltage and the reference voltage is less than the preset threshold value; and when the first switch transistor is a N type transistor, the comparator outputs the high level signal to the gate of the first switch transistor when the difference between the common voltage and the reference voltage is greater than or equal to the preset threshold value, and outputs the low level signal to the gate of the first switch transistor when the difference between the common voltage and the reference voltage is less than the preset threshold value.

16. The array substrate as claimed in claim 13, wherein the inversion sub-circuit comprises a first inverter;

an input terminal of the first inverter is connected with the drain of the first switch transistor, and an output terminal of the first inverter is connected with an input terminal of the voltage regulation sub-circuit.

17. The array substrate as claimed in claim 16, wherein the voltage regulation sub-circuit comprises: a voltage input sub-circuit, a voltage selecting sub-circuit and a voltage output sub-circuit; wherein, the voltage input sub-circuit is configured to output the received signal sent by the first inverter to a first input terminal of the voltage selecting sub-circuit, and to output an inverted signal of the received signal sent by the first inverter to a second input terminal of the voltage selecting sub-circuit;

the voltage selecting sub-circuit configured to outputs a first reference signal to the voltage output sub-circuit when the signal sent by the first inverter and received by the voltage input sub-circuit is the second level signal; and to output a second reference signal to the voltage output sub-circuit when the signal sent by the first inverter and received by the voltage input sub-circuit is the zero voltage signal;

the voltage output sub-circuit is configured to output the reference voltage to the common electrode line in the display panel when the first reference signal sent by the voltage selecting sub-circuit is received; and to output the zero voltage signal to the common electrode line in the display panel when the second reference signal sent by the voltage selecting sub-circuit is received.

18. The array substrate as claimed in claim 17, wherein the voltage input sub-circuit comprises a second inverter;

an input terminal of the second inverter is connected with the output terminal of the first inverter and a first input terminal of the voltage selecting sub-circuit respectively; and an output terminal of the second inverter is connected with a second input terminal of the voltage selecting sub-circuit.

19. The array substrate as claimed in claim 18, wherein the voltage selecting sub-circuit comprises a second switch transistor and a third switch transistor having a same doping polarity as well as a fourth switch transistor and a fifth switch transistor having a same doping polarity; wherein, a gate of the second switch transistor is connected with the output terminal of the first inverter and the input terminal of the second inverter respectively, a source of the second switch transistor is connected with a first reference signal terminal, and a drain of the second switch transistor is connected with a first node;

a gate of the third switch transistor is connected with the output terminal of the second inverter, a source of the third switch transistor is connected with the first reference signal terminal, and a drain of the third switch transistor is connected with a second node;

a gate of the fourth switch transistor is connected with the second node, a source of the fourth switch transistor is connected with a second reference signal terminal, a drain of the fourth switch transistor is connected with the first node; and a gate of the fifth switch transistor is connected with the first node, a source of the fifth switch transistor is connected with the second reference signal terminal, and a drain of the fifth switch transistor is connected with the second node.

20. A compensating method of a common voltage compensation circuit, comprising:

comparing, by a comparison sub-circuit, a common voltage loaded on a common electrode line in a display panel with a reference voltage; outputting a zero voltage signal to an inversion sub-circuit when a difference between the common voltage and the reference voltage is greater than or equal to a preset threshold value; and outputting a first level signal to an inversion sub-circuit when the difference between the common voltage and the reference voltage is less than the preset threshold value;

outputting, by the inversion sub-circuit, second level signal to a voltage regulation sub-circuit when the zero voltage signal sent by the comparison sub-circuit is received; and outputting the zero voltage signal to the voltage regulation sub-circuit when the first level signal sent by the comparison sub-circuit is received;

outputting, by the voltage regulation sub-circuit, the reference voltage to the common electrode line in the display panel when the second level signal sent by the inversion sub-circuit is received; and outputting the zero voltage signal to the common electrode line in the display panel when the zero voltage signal sent by the inversion sub-circuit is received.

* * * * *